United States Patent [19]
Nels

[11] Patent Number: 5,842,551
[45] Date of Patent: Dec. 1, 1998

[54] FABRIC ARRANGEMENT AND METHOD FOR CONTROLLING FLUID FLOW

[76] Inventor: Terry E. Nels, 2973 Southfield Dr., Beavercreek, Ohio 45434

[21] Appl. No.: 794,178

[22] Filed: Feb. 3, 1997

Related U.S. Application Data

[63] Continuation of Ser. No. 316,204, Sep. 30, 1994, Pat. No. 5,615,758.

[51] Int. Cl.$^6$ ............................. F16D 69/02; F16D 13/72
[52] U.S. Cl. .............................. 192/107 M; 192/113.36; 188/251 A; 442/219; 442/252
[58] Field of Search ......................... 192/107 M, 107 R, 192/70.12, 70.14, 113.3, 113.34, 113.36; 188/251 A, 264 E; 442/219, 252; 428/408, 902

[56] References Cited

U.S. PATENT DOCUMENTS

| | | |
|---|---|---|
| 1,682,198 | 8/1928 | Sitton . |
| 1,860,147 | 5/1932 | Hadley . |
| 2,025,039 | 12/1935 | Cannon ................................. 442/219 X |
| 2,307,814 | 1/1943 | Walters .................................... 139/409 |
| 2,555,261 | 5/1951 | Walters ........................... 192/107 M X |
| 2,702,770 | 2/1955 | Steck ......................................... 154/81 |
| 3,429,766 | 2/1969 | Stormfeltz ....................... 192/107 M X |
| 3,520,390 | 7/1970 | Bentz ................................. 192/107 M |
| 3,526,306 | 9/1970 | Bentz et al. ....................... 192/107 M |
| 3,654,777 | 4/1972 | Grundsman .................................. 64/30 |
| 3,927,241 | 12/1975 | Augustin ................................. 428/408 |
| 4,045,608 | 8/1977 | Todd ........................................ 428/251 |
| 4,260,047 | 4/1981 | Nels ..................................... 192/70.14 |
| 4,267,912 | 5/1981 | Bauer et al. .............................. 192/53 |
| 4,291,794 | 9/1981 | Bauer ...................................... 192/107 |
| 4,639,392 | 1/1987 | Nels et al. ............................... 428/283 |
| 4,700,823 | 10/1987 | Winckler ................................ 192/107 |
| 4,732,247 | 3/1988 | Frost ........................................... 192/53 |
| 4,878,282 | 11/1989 | Bauer ..................................... 29/149.5 |
| 4,917,743 | 4/1990 | Gramberger et al. ..................... 156/89 |
| 4,950,530 | 8/1990 | Shibatani ........................ 192/107 M X |
| 4,995,500 | 2/1991 | Payvar .................................. 192/107 R |
| 4,997,067 | 3/1991 | Watts .............................. 192/107 M X |
| 5,038,628 | 8/1991 | Kayama ..................................... 74/339 |
| 5,076,882 | 12/1991 | Oyanagi et al. ......................... 156/300 |
| 5,143,192 | 9/1992 | Vojacek et al. .......................... 192/107 |
| 5,221,401 | 6/1993 | Genise ..................................... 156/293 |
| 5,690,770 | 11/1997 | Booher ........................... 188/251 A X |

FOREIGN PATENT DOCUMENTS

| | | |
|---|---|---|
| 0393845 | 10/1990 | European Pat. Off. . |
| 0510875 | 10/1992 | European Pat. Off. . |
| 0581696 | 2/1994 | European Pat. Off. . |
| 2430545 | 2/1980 | France . |

OTHER PUBLICATIONS

Hocbriger and Co., 1992, "New Dimensions ' Inc. Tough Composites", Atlantic Research Corporation, 1991.
"Synchronizer Blocker Ring With Organic Lining", Gunter Lanzerath and Helmut Patzer, Borg–Warner Automotive GmbH, SAE Technical Papeer Series 860384, Feb., 1986.
"New Friction Materials and New Concepts for Single and Multiple Synchronizer Systems,".

*Primary Examiner*—Richard M. Lorence
*Attorney, Agent, or Firm*—Jacox, Meckstroth & Jenkins

[57] ABSTRACT

In accordance with one aspect of the present invention, a material for an element of a power transmission-absorption assembly and the method of making such material is disclosed. The material has a pre-selected channel configuration to permit flow of a cooling medium thereacross or therethrough.

79 Claims, 13 Drawing Sheets

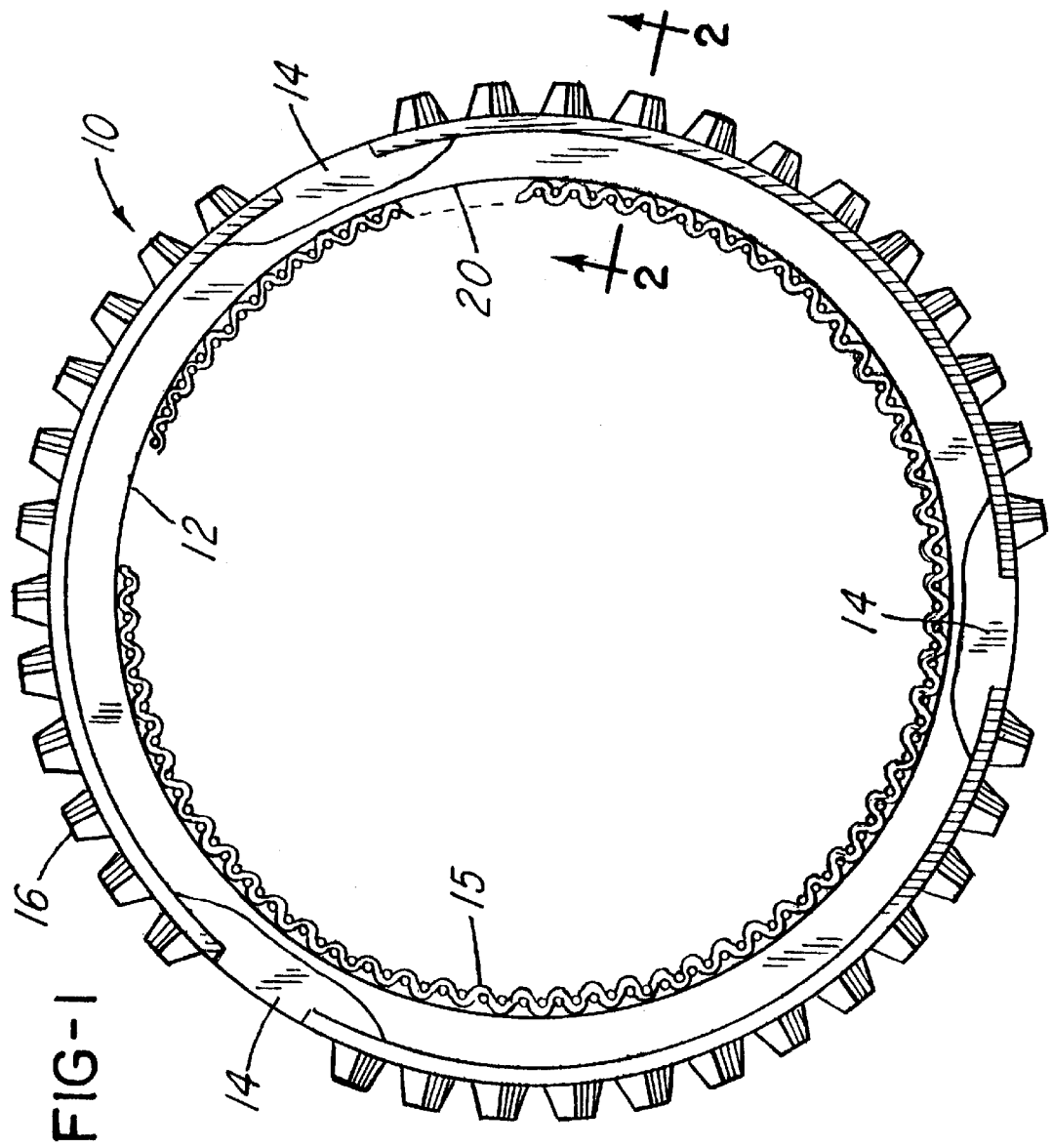

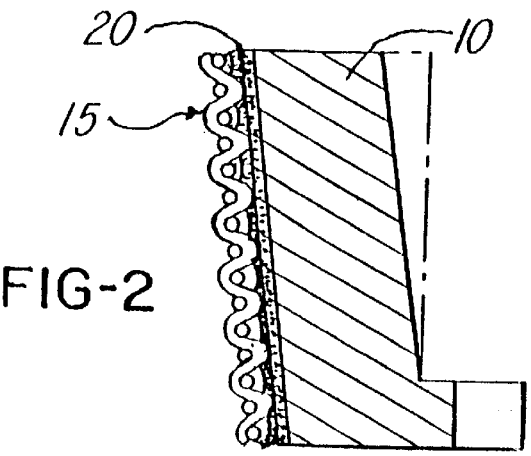
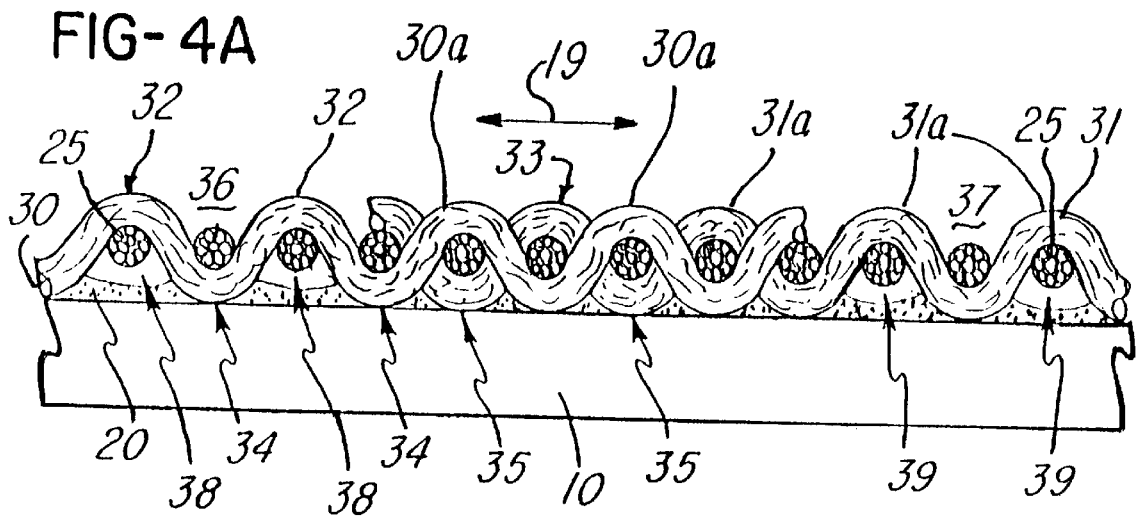
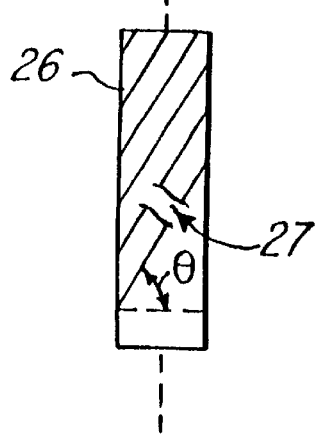
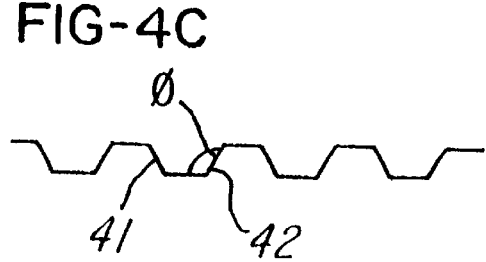

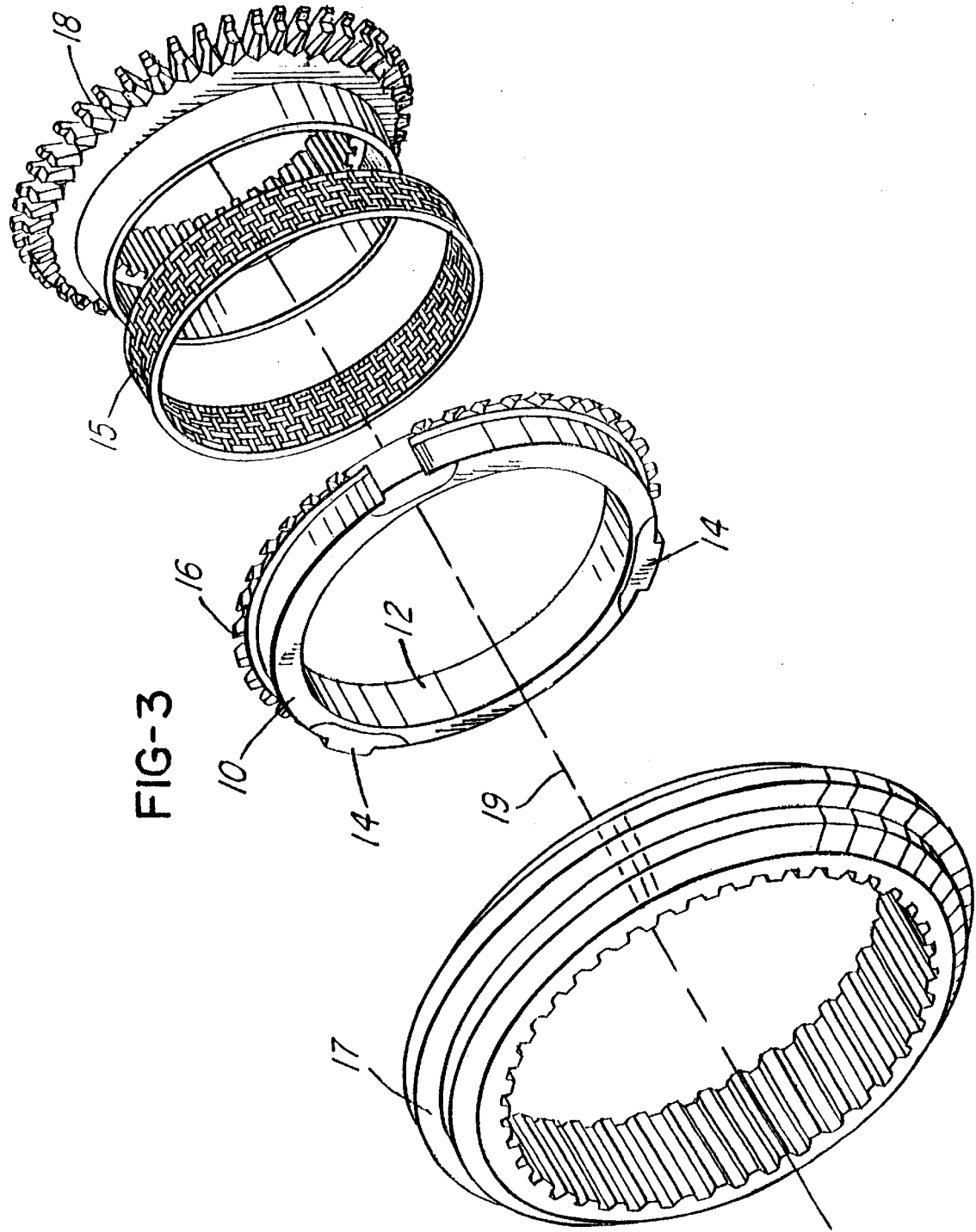

FIG-7
Plain
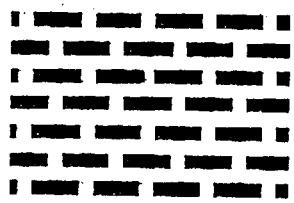
Crowfoot Satin
2x2 Basket
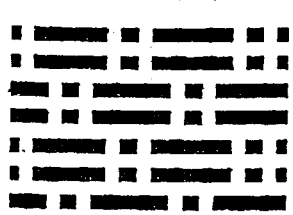
5HS
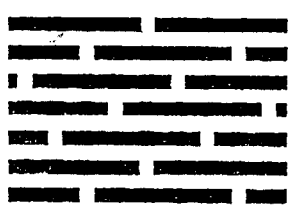
8HS
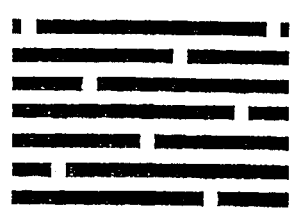
Leno
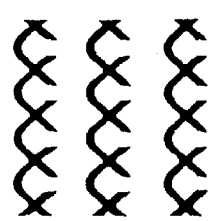
2/2 Twill
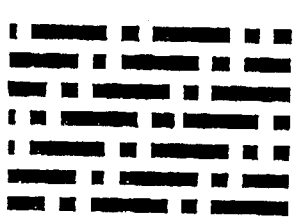
2/1 Twill
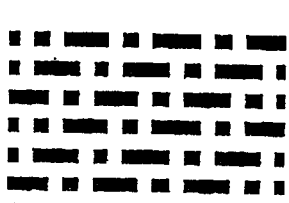
Non-Crimp
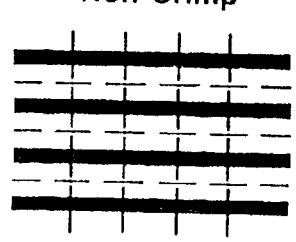
±45° Plain
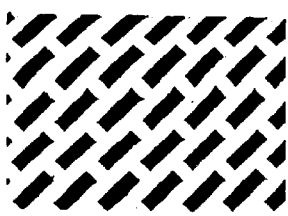
±45° 8HS
±45° Crowfoot Satin

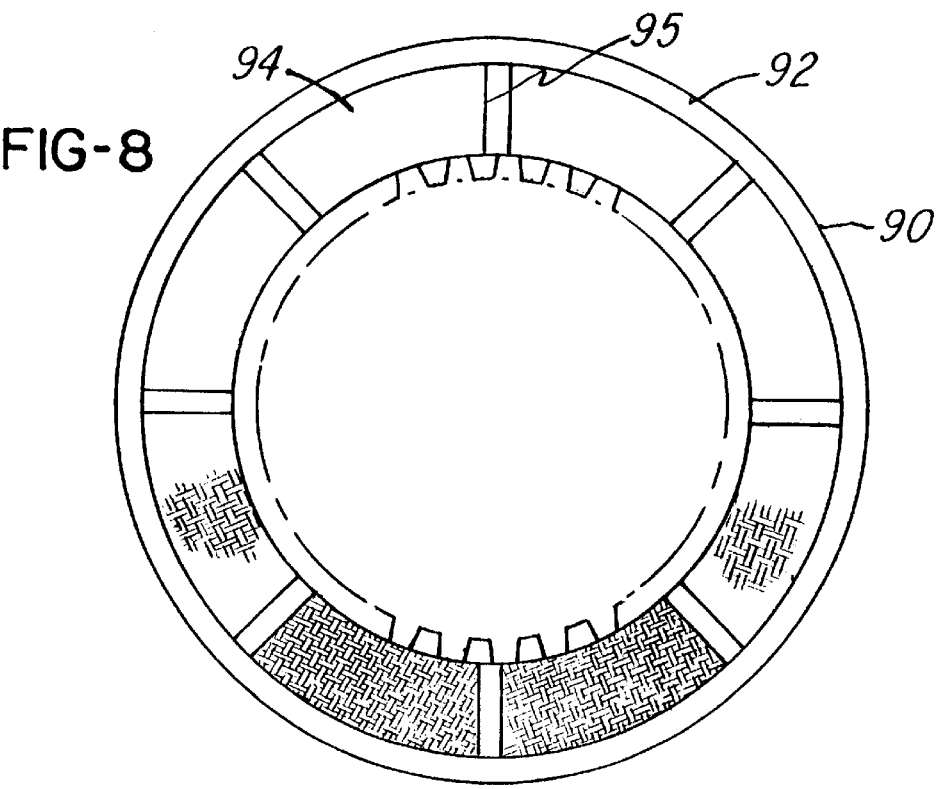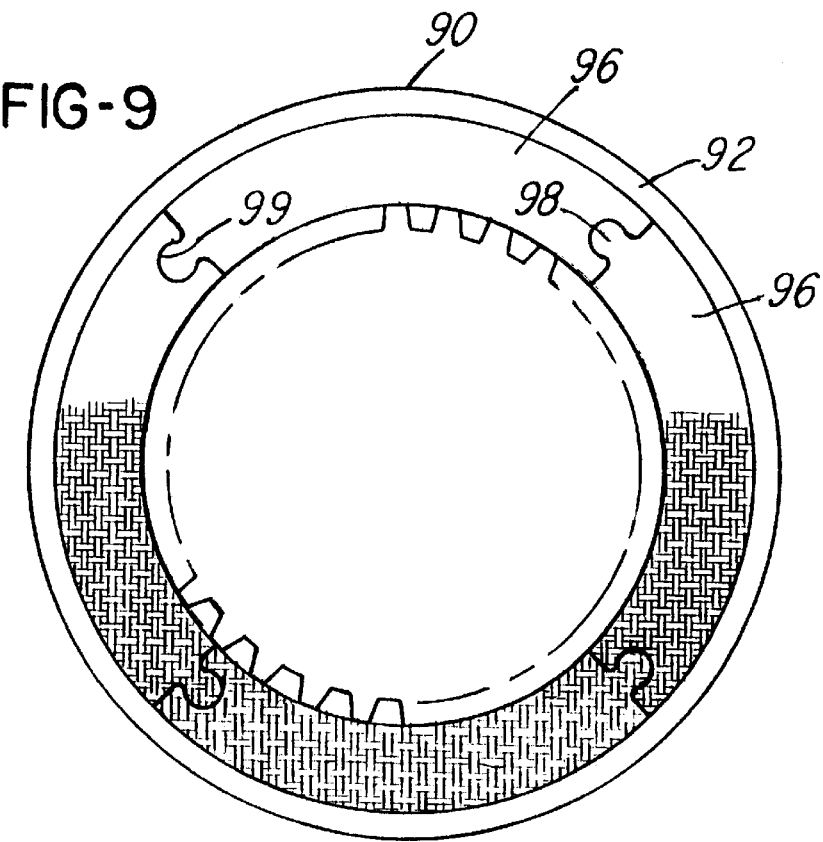

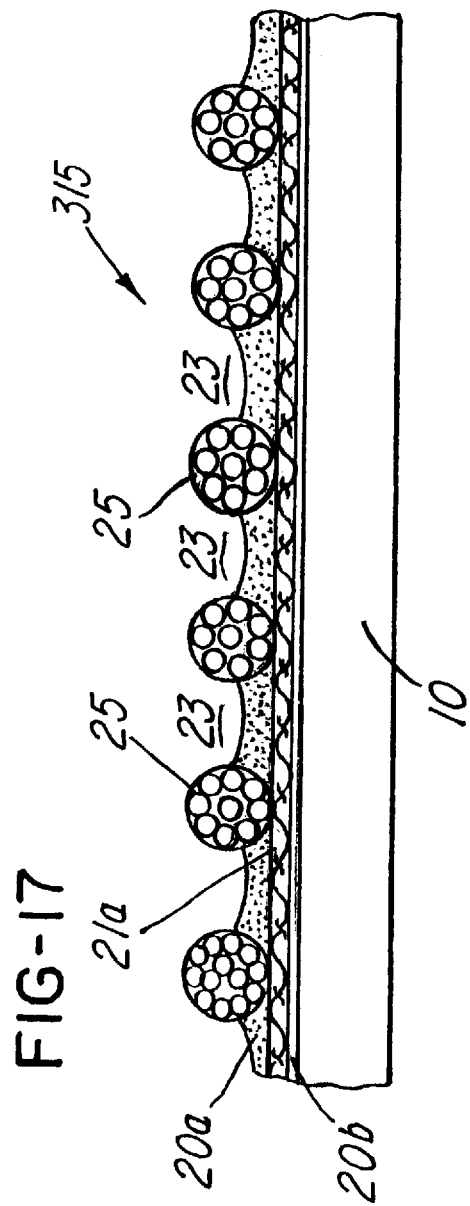

FABRIC ARRANGEMENT AND METHOD FOR CONTROLLING FLUID FLOW

CROSS-REFERENCE TO RELATED APPLICATION

This application is a continuation of Ser. No. 08/316,204 filed Sep. 30, 1994 now U.S. Pat. No. 5,615,758.

BACKGROUND OF THE INVENTION

1. Field of the Invention

The present invention relates to a fabric arrangement and method for controlling fluid flow and, more particularly, to a fabric arrangement and method for controlling fluid flow which may be utilized with friction elements.

2. Description of Related Art

In clutches, brakes, automatic transmissions, limited slip differentials, hoists and similar friction power transmission and energy absorption devices, there is generally provided one or more sets of cooperating members, in which one of the cooperating members drives the other. It is not uncommon for these cooperating members to move in a cooling medium or liquid, which is generally some type of lubricating oil, and frequently the oil is force circulated about and between the engaging surfaces of the cooperating members so as to continuously lubricate and cool them. In order to accomplish circulation of the cooling medium within blocker rings, clutch plates, transmission bands and the like, the prior art has provided grooves or slots directly in the engaging surfaces of one or both of the cooperating members or in friction material affixed thereto. For example, such a friction material may be a brass coating or a paper liner as seen in U.S. Pat. No. 4,267,912 to Bauer et al., U.S. Pat. No. 4,878,282 to Bauer, and U.S. Pat. No. 4,260,047 to Nels.

Forming grooves within the friction material of cooperating members not only adds complexity to the manufacture of such friction material and the power transmission-absorption device, but also is limited in its ability to circulate cooling medium therethrough. In order to reduce or eliminate the hydrodynamic friction stemming from oil or cooling medium lying on the surface of the friction material engaging the driving member, an improved friction material for circulating the cooling medium is required, especially one which may be varied according to desired parameters.

Prior art friction materials also include certain pyrolytic carbon friction materials as seen in U.S. Pat. No. 4,700,823 to Winckler and U.S. Pat. No. 4,291,794 to Bauer. In such friction material, a meshed cloth substrate formed of carbon fibers is provided with a coating of carbon or other material being deposited on the fibers by chemical vapor deposition. This type of friction material has the characteristic of a relatively open mesh which allows ready penetration by an adhesive for improved bonding, as well as a certain degree of porosity therethrough. However, as pointed out in the '794 patent, grooving of such material is still provided in order to permit the flow of the cooling fluid between the friction faces of the cooperating members of the power transmission or energy absorption assembly. This type of friction material also does not easily provide highly bonded fibers at a friction surface of the material nor does it achieve a highly controlled texture as needed. Moreover, it has been found that such friction material is difficult to compress to a desired thickness, such as during the process of bonding it to a member.

It is also seen that such pyrolytic friction material utilizes as its substrate a plain weave of the type illustrated in FIG. 6, where both the fill and warp yarns of the material contact the cooperating element. Such an arrangement leads to increased wear of the friction material due to the effect on the yarns oriented perpendicularly to the direction of motion for the cooperating element. Therefore, an additional desired feature not found in prior art devices is a friction surface texture which reduces wear on the friction material.

SUMMARY OF THE INVENTION

In accordance with one aspect of the present invention, a material is disclosed having a plurality of first yarns and a plurality of second yarns woven with the plurality of first yarns to form a predetermined arrangement in order to control fluid flow.

A second aspect of the present invention is a friction power absorption or power transmission assembly of the type having means for changing the relative position between a friction material and an opposing surface material from a position of complete engagement to a position of complete disengagement, the assembly including a first member, a second opposing member, a friction facing material affixed to one of the first and second members, the friction facing material being a woven fabric having a plurality of first yarns positioned in substantially parallel relationship to each other and a plurality of second yarns woven in serpentine fashion over and under the first yarns to form a texture having a plurality of plateaus and valleys, wherein only the plateaus of the woven fabric engage the other of the members, and means for introducing a liquid cooling medium between the first and second members.

Further, a method of making a friction facing material for use in a power absorption-transmission assembly is disclosed involving the steps of weaving a plurality of yarns in a predetermined pattern so as to form a woven fabric having a texture with a plurality of plateaus and valleys therein, fixing the woven fabric yarns in position, and providing an adhesive to the woven fabric.

Accordingly, one objective of the present invention is to provide a friction facing material for use with cooperating members of a power transmission-absorption device which is able to circulate cooling medium therethrough without the need for machining additional grooves or slots.

A further objective of the present invention is to provide a friction facing material for use with cooperating members of a power transmission-absorption device which can be oriented with respect to the direction of movement between the cooperating members so as to reduce wear and spin loss thereof.

Yet another objective of the present invention is to provide a friction facing material for use with cooperating members of a power transmission-absorption device which can be woven so as to include flow channels of desired size and orientation.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

FIG. 1 is a front view of a blocker ring having a friction facing material bonded thereon in accordance with the present invention;

FIG. 2 is an enlarged, partial cross-sectional view of the blocker ring in FIG. 1;

FIG. 3 is an exploded perspective view of the blocker ring depicted in FIGS. 1 and 2 with its cooperating elements in a typical power transmission-absorption assembly;

FIG. 4A, which is shown on the same sheet as FIG. 2, is an enlarged, diagrammatic side view of the friction facing material of FIGS. 1–3 prior to bonding;

FIG. 4B, which is shown on the same sheet as FIG. 2, is a partial, magnified view of a single yarn in the friction facing material of FIG. 4A;

FIG. 4C, which is shown on the same sheet as FIG. 2, is a partial, diagrammatic side view of the channels defined in the friction facing material of FIG. 4A, where the plateaus and low points are depicted in their state after bonding;

FIG. 7 is a diagrammatic depiction of several exemplary weave styles which may be employed in the friction facing material of the present invention;

FIG. 8 is a diagrammatic depiction of the friction facing material of the present invention being circumferentially arranged as non-interlocking arcuate segments on a clutch plate;

FIG. 9 is a diagrammatic depiction of the friction facing material of the present invention being circumferentially arranged as interlocking arcuate segments on a clutch plate;

FIG. 17 is an enlarged diagrammatic side view of a fourth embodiment of the friction facing material of the present invention.

DETAILED DESCRIPTION OF THE INVENTION

Figure 5:
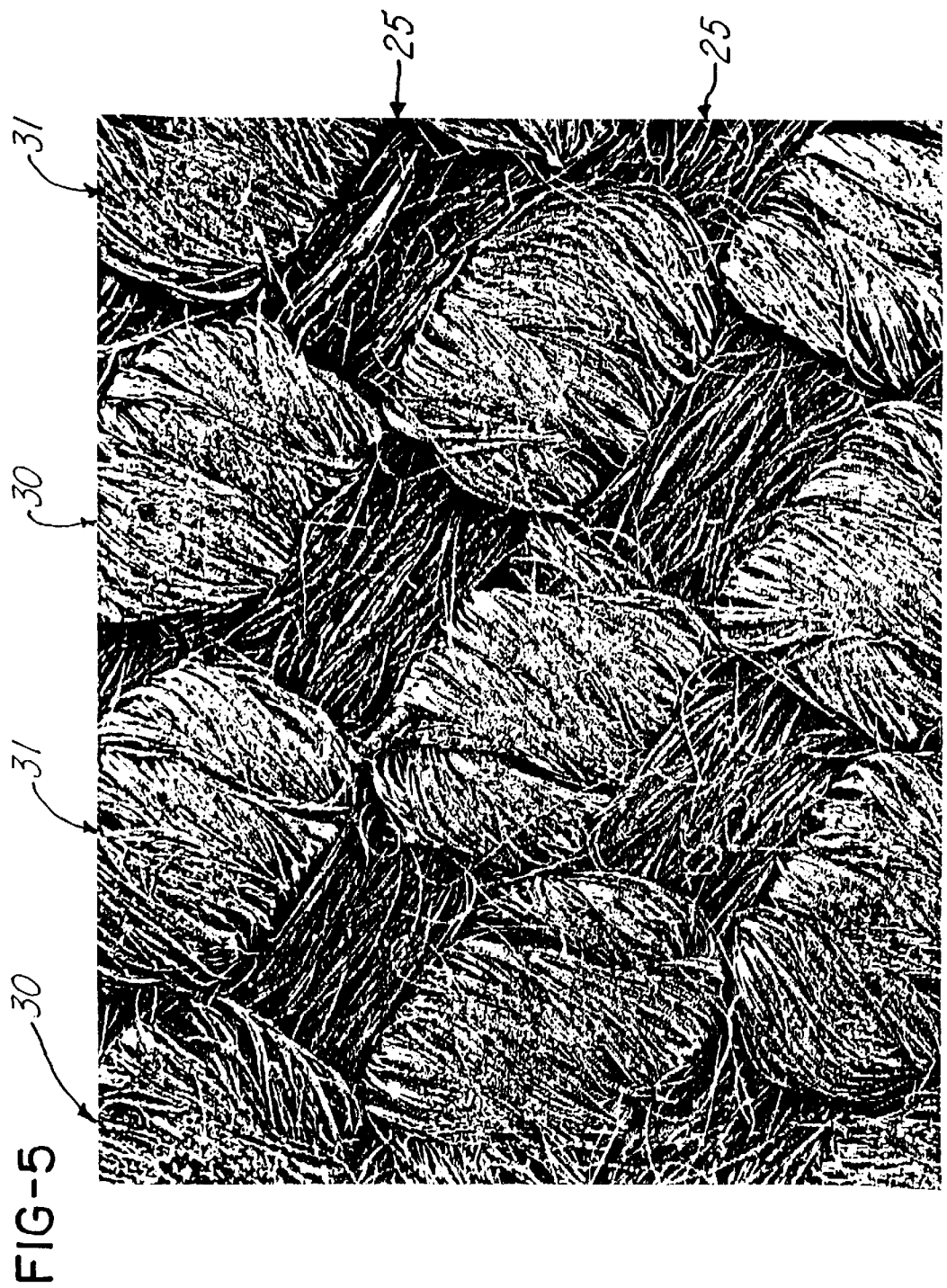
FIG. 5 is a photograph of the friction facing material depicted in FIG. 4A.

Referring now to the drawing in detail, wherein identical numerals indicate the same elements throughout the figures, FIG. 1 depicts a blocker ring 10 including a friction facing material 15 affixed to an inner annular wall 12 thereof in conjunction with the present invention. It will be understood that blocker ring 10 is one element of a power transmission or absorption assembly such as that utilized in clutches, brakes, automatic transmissions, limited slip differentials, hoists and other similar friction power transmission and energy absorption devices. One example of the environment in which blocker ring 10 may be utilized is disclosed in U.S. Pat. No. 4,732,247 to Frost, which is hereby incorporated by reference. While blocker ring 10 and friction facing material 15 discussed herein may be utilized with such friction power transmission and energy absorption devices, it will be understood that friction facing material 15 of the present invention is not limited to such specific devices. For example, friction facing material 15 may be utilized in other friction devices such as clutch plates, torque converter clutches, and transmission bands. Moreover, it is contemplated that the material of the present invention could be utilized in other devices where the control of fluid flow is required, such as gaskets, filters, nozzles, and the like.

As seen in FIG. 1, blocker ring 10 includes three raised lugs 14 equally spaced at 120° intervals around blocker ring 10. Lugs 14 may be nested within associated hub notches of another member 17 of the assembly (not shown). As best seen in FIG. 3, blocker ring 10 also has a toothed or splined surface 16 formed on the outer circumference thereof which is engagable with member 17 of the power transmission-absorption assembly and thereby able to clock or rotate member 17 in accordance with a cooperating friction element 18 causing movement along inner annular wall 12. As best seen in FIGS. 1 and 2, friction facing material 15 of the present invention is affixed to inner annular wall 12 of blocker ring 10 by means of a layer of adhesive 20, such as nitrile phenolic adhesive. It will be understood that cooperating friction element 18 (see FIG. 3) is movable along a longitudinal axis 19 in order to engage and disengage blocker ring 10.

FIG. 4A depicts a diagrammatic side view of friction facing material 15 in its initial state, which includes a plurality of substantially linear fill yarns 25 arranged substantially parallel to each other. A plurality of substantially parallel warp yarns 30 shown in a sinusoidal side view in FIG. 4A are woven with fill yarns 25 in a serpentine fashion (i.e., over and under adjacent fill yarns 25) to form a series of high points 32 (known as "plateaus") and a series of low points 34 (known as "adhesion points"). Positioned between each warp yarn 30 is a second set of warp yarns 31, which also are woven in serpentine fashion with fill yarns 25 to form a series of plateaus 33 and a series of adhesion points 35. However, in order to maintain the construction of friction facing material 15, warp yarns 31 are out of phase with warp yarns 30 so that plateaus 32 of warp yarns 30 are opposite adhesion points 35 of warp yarns 31 and adhesion points 34 of warp yarns 30 are opposite plateaus 33 of warp yarns 31. By weaving warp yarns 30 and 31 with fill yarns 25 in this way, a plurality of upper channels 36 and 37 (known as "valleys") are formed between adjacent plateaus 32 and adjacent plateaus 33, respectively. Likewise, a plurality of lower channels 38 and 39 may be formed between adjacent adhesion points 34 and adhesion points 35.

Figure 6:
FIG. 6 is a photograph of a prior art friction facing material having a plain weave.
Figure 10:
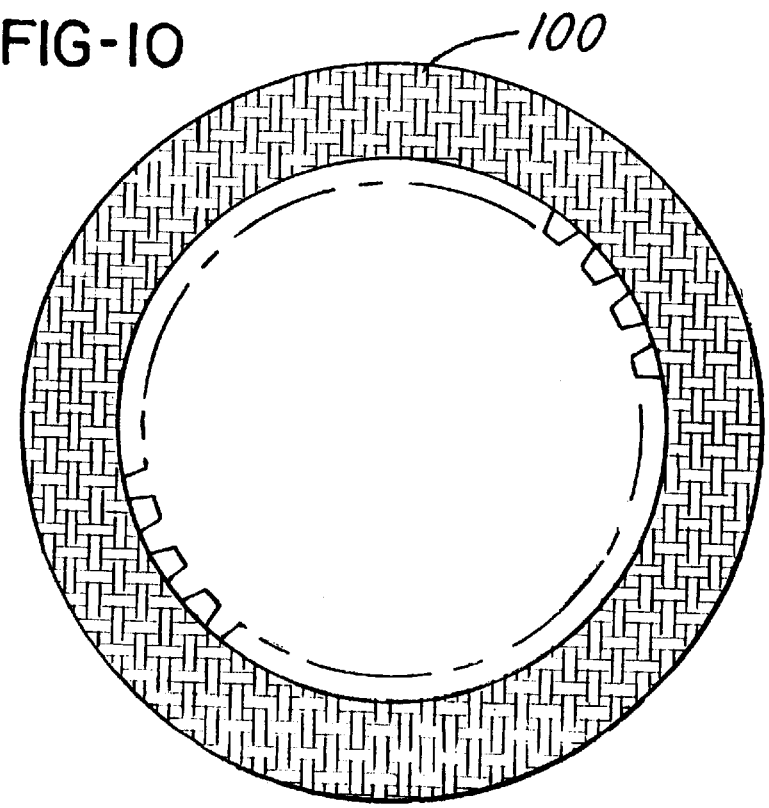
FIG. 10 is a diagrammatic depiction of the friction facing material of the present invention being arranged as a plain cut full ring on a clutch plate.

Further, as best seen in FIG. 5, fill yarns 25 may be tensioned by a greater amount than warp yarns 30 and 31, which also facilitates defining the formation of upper channels 36 and 37 in a predetermined or desired weave pattern. Because plateaus 32 and 33 of warp yarns 30 and 31 extend above fill yarns 25, it will be understood that only warp yarn surfaces 30a at plateaus 32 and warp yarn surfaces 31a at plateaus 33 (see FIG. 4A) of friction facing material 15 will engage cooperating friction member 18. In order to reduce wear of friction facing material 15, it is preferred that warp yarns 30 and 31 be positioned so that they are aligned substantially parallel to longitudinal axis 19 (see FIGS. 3 and 4A) which is also the direction of relative motion between blocker ring 10 and cooperating friction element 18 to reduce wear on friction facing material 15. It is to be noted that some prior art materials provide warp yarns and fill yarns having engaging surfaces at the same level (see FIG. 6). Consequently, at least some of the yarns are oriented substantially perpendicular to the direction of movement between the cooperating friction members. This, in turn, causes increased wear of the material and/or the cooperating friction member. It should also be noted that while warp yarns 30 and 31 are shown as being woven with substantially linear fill yarns 25, the warp yarns may be substantially linear and two sets of fill yarns may be woven therewith.

It will also be noted that a layer of adhesive 20 is preferably provided so that it engages only adhesive points 34 and 35 of warp yarns 30 and 31, respectively. In this way, both upper channels 36 and 37 and lower channels 38 and 39 (see FIG. 4A) are able to provide flow paths for cooling medium, such as oil, in the power transmission-absorption assembly.

As depicted by the side view representation in FIG. 4C, it will be understood that upper channels 36 and 37, as well as lower channels 38 and 39, preferably have tapered sides 41 and 42. An angle φ exists between side walls 41 and 42 and the respective plateaus and adhesion points of warp yarns 30 and 31, with angle φ having an angle in the range of 20°–70°, and preferably approximately 45°. By having channels 36–39 formed in this way, exiting of cooling medium therethrough is facilitated due to the Bernoulli theorem.

Further, it will be seen from FIG. 4C that bonding of friction facing material 15 onto a friction element will have a flattening effect on plateaus 32 and 33 of warp yarns 30 and 31, as well as on low points 34 and 35 thereof.

Fill yarns 25 and warp yarns 30 and 31 preferably are carbonized both before and after weaving, with friction facing material 15 preferably being saturated with resin and cured to further fix fill yarns 25 and warp yarns 30 and 31 in the predetermined or desired weave pattern. Even so, friction facing material 15 will generally retain interconnection between upper channels 36 and upper channels 37, while maintaining desired strength characteristics, provided the resin applied thereto is maintained within a range of about 35–50% of friction facing material 15.

With regard to the construction of fill yarns 25 and warp yarns 30 and 31, it has been found that at least nine (9) twists per inch provide suitable definition of the texture for friction facing material 15. In this way, upper channels 36 and 37 and lower channels 38 and 39 thereof become more distinct, thereby increasing the ability of cooling medium to flow therethrough. It will be understood that in order for fill yarns 25 and warp yarns 30 and 31 to have nine twists per inch, an angle θ existing between each fibril 26 and a longitudinal axis 28 (see FIG. 4B), is approximately 27° for a yarn having a diameter of 0.018 inches. Because there is a direct relationship between angle θ and the twists per inch of the yarn, it will be understood that angle θ increases as the twists per inch of the yarn increases. Thus, an angle θ of 27° or greater for fibrils 26 of each yarn will consequently provide the desired definition of the texture for friction facing material 15, as well as a column strength that will desirably protect against compressive loads.

It will also be understood that during the yarn manufacturing, the fibrils 26 of warp yarns 30 and 31 will fracture at various points due to the stretching thereof while in a carbonized state. Accordingly, such fibrils 26 may have a length of approximately ¼ to 1½ inch between fracture points 27 (see FIG. 4C). This construction permits heat to be conducted through the length of a yarn by means of fibrils 26 to fracture points 27, whereupon the heat can then be transmitted to the cooling medium contained within lower channels 38 and 39.

Another preference of the embodiment herein described is to weave warp yarns 30 and 31 with fill yarns 25 so that plateaus 32 and 33 of warp yarns 30 and 31 have a maximum surface area across friction facing material 15. One manner of increasing such surface area is to weave warp yarns 30 and 31 over more adjacent fill yarns 25 than the number of adjacent fill yarns 25 they are woven under. For example, warp yarns 30 and 31 may be woven over at least two adjacent fill yarns 25 and under at least one fewer adjacent fill yarns 25 alternatively to create a satin weave fabric (see, e.g., the crowfoot satin weave of FIG. 7, where the dark portions represent plateaus 32 and the white portions represent valleys 36 and 37 therebetween). This type of weave creates rectangular plateaus of increased surface area for contacting a cooperating friction element, which is particularly useful in a dry friction element such as brake and clutch facings, whereby improvement in both wear resistance and thermal conductivity is achieved.

It will be understood, however, that any number of weaves may be utilized or provided with friction facing material 15, including the exemplary weaves shown in FIG. 7 (e.g., plain, crowfoot satin, 2×2 basket, 5 HS, 8 HS, Leno, ⅔ twill, ¾ twill, non-crimp, ±45° plain, ±45° 8 HS, and ±45° crowfoot satin). In fact, such weaves may be selected, designed or utilized to control the size, number, and orientation of upper channels 36 and 37 and lower channels 38 and 39, and consequently the flow paths across friction facing material 15. Accordingly, the amount and velocity of oil or other cooling medium forced across friction facing material 15 can be controlled.

While a preferred material for friction facing material 15 is carbon, it will be understood that fiberglass, silicone carbide, copper, ceramic, Kevlar, asbestos, or any other material having the required strength, temperature resistance, friction characteristics, and processibility for the intended application may be utilized.

Figure 15:
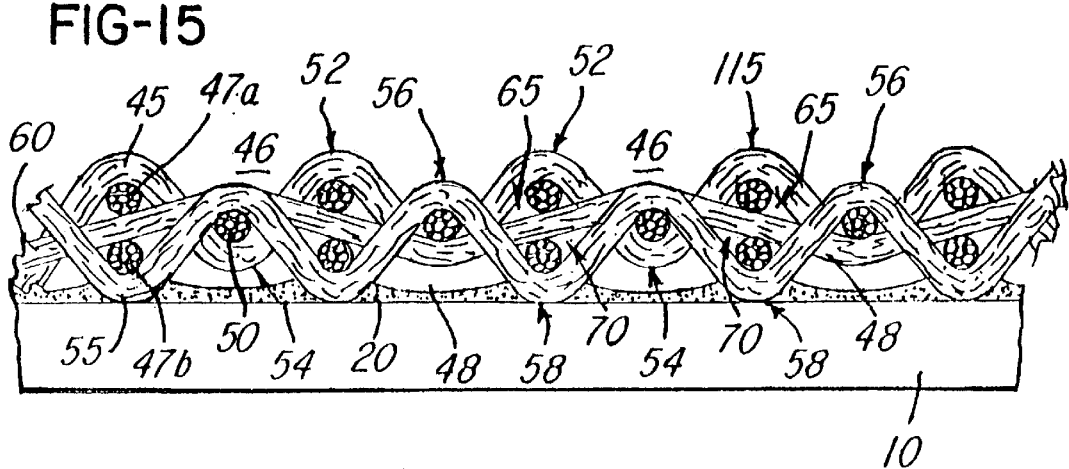
FIG. 15 depicts an enlarged, diagrammatic side view of an alternate embodiment for the friction facing material of the present invention.
Figure 16:
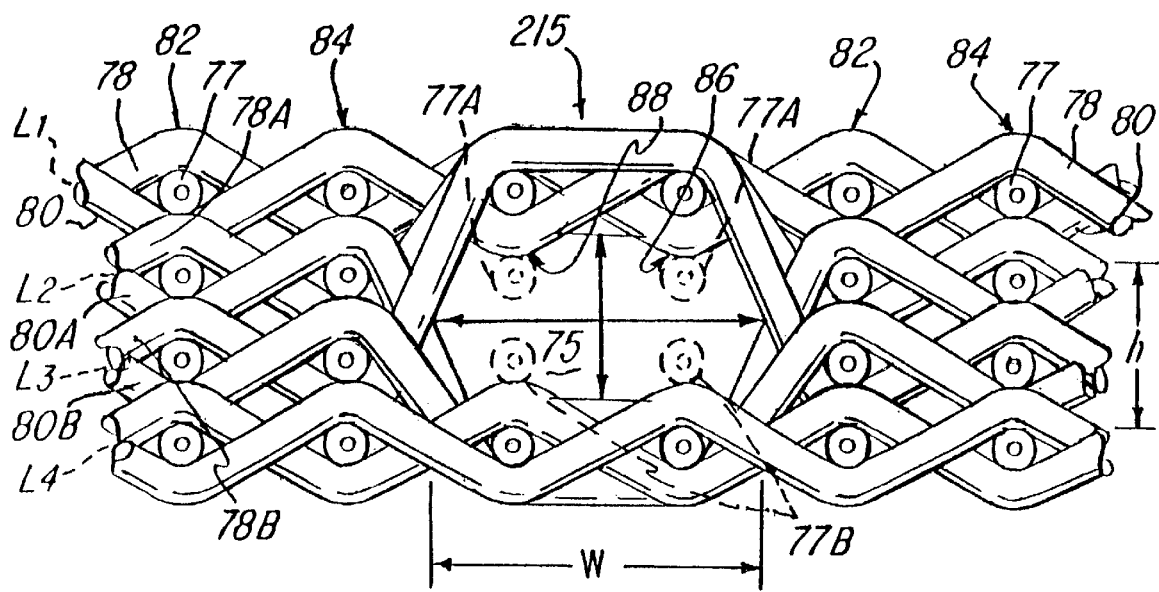
FIG. 16 is an enlarged diagrammatic side view of a third embodiment of the friction facing material of the present invention.

It will also be seen from FIGS. 15 and 16 that the friction facing material of the present invention may have several layers of fill and warp yarns. Such a multi-layered arrangement not only improves the durability of friction facing material 15, but may include internal cooling vents which further enhances the flow of cooling oil or air therein. Specifically, as seen in FIG. 15, friction facing material 115 contains fill yarns in a dual layer—single layer—dual layer alternating arrangement. A first set of warp yarns 45 is woven over dual layer fill yarns 47a and 47b and under single layer fill yarns 50 in serpentine fashion so as to form a plurality of high points or plateaus 52 and low points 54. A second set of warp yarns 55, which is positioned between adjacent first warp yarns 45, is woven in serpentine fashion under dual layer fill yarns 47a and 47b and over single layer fill yarns 50 (i.e., substantially 90° out of phase with first warp yarns 45) to form high points or plateaus 56 and low points or adhesion points 58 which are opposite low points 54 and plateaus 52, respectively. A third set of warp yarns 60 is woven between dual layer fill yarns 47a and 47b and alternatively over and under single layer fill yarns 50, and is preferably positioned between each adjacent first and second warp yarn 45 and 55, respectively. Accordingly, a plurality of upper cooling vents 65 and lower cooling vents 70 are formed within friction facing material 115. Thus, not only are upper channels 46 between adjacent plateaus 52 of first warp yarns 45 and lower channels 48 between adjacent adhesion points 58 of second warp yarns 55 present for flow of oil discharge thereacross, but internal cooling vents 65 and 70 may also be utilized for the flow of cooling oil or air.

Another embodiment of the friction facing material (designated by the number 215) is depicted in FIG. 16, where the multi-layered material thereof may be provided or weaved to include internal cooling vents 75 of predetermined size and shape. As seen therein, multiple layers of substantially linear fill yarns 77 are arranged in a substantially parallel configuration. It will be seen that two sets of warp yarns 78 and 80 are provided for each layer of fill yarns 77, where first warp yarns 78 and second warp yarns 80 are woven in serpentine fashion with fill yarns 77 but in juxtaposition with respect to each other so that plateaus 82 and 84 and valleys 86 and 88 thereof are approximately 90° out of phase. In order to form a relatively large internal cooling or fluid flow vent or channel 75, certain specified fill strands (such as 77A and 77B shown in phantom in FIG. 16) are omitted from various locations and layers to facilitate providing the cooling vent or channel 75 having a predetermined configuration. Accordingly, first warp yarns 78A, 78B and second warp yarns 80A, 80B normally woven with such omitted fill yarns 77A and 77B may be woven with fill yarns 77 of a different layer (e.g., top and bottom fill yarn layers $L_1$ and $L_4$ as shown in FIG. 16). While warp yarns 78A, 78B, 80A, and 80B are shown as being woven with top and bottom layers $L_1$ and $L_4$ of fill yarns 77, thereby providing the greatest available height dimension h for internal cooling vent 75, it will be understood that fill yarns 77 for any given layer may be omitted to provide internal cooling vents 75 of greater or lesser height h so long as at least two layers of fill strands 77 remain for weaving purposes. Further, any number of adjacent fill yarns 77 may be omitted to give internal cooling vent 75 a greater or lesser width. To simplify weaving, it is preferred that internal cooling vents or channels 75 be of the same size and shape and repeat in symmetric fashion; however, internal cooling vents 75 may be dissimilar and asymmetric according to the needs of a specific application.

Yet another alternative embodiment for the friction facing material of the present invention, identified by the numeral 315, is depicted in FIG. 17, where only a plurality of substantially parallel yarns (indicated as fill yarns 25 but also may be warp yarns) is provided in conjunction with a layer of scrim 21 on blocker ring 10. In this arrangement, it is preferred that scrim 21 be saturated with adhesive or resin (although separate adhesive layers 20*a* and 20*b* may be utilized), whereby yarns 25 may be attached thereto and scrim 21 may be attached to inner annular wall 12 of blocker ring 10. It will be understood that a plurality of substantially linear channels 23 will be formed between adjacent fill yarns 25, which may be utilized to conduct lubricating/cooling fluid across friction facing material 315. Depending on a given application, it will be understood that channels 23 can be oriented on a friction element so as to be at an angle between 0° and 90° to the sliding surface of the friction element.

While friction facing material 15 has been depicted as being positioned on inner annular wall 12 of blocker ring 10, it could just have easily been positioned upon an outer annular wall 22 of cooperating friction element 18 (see FIG. 3). Moreover, as seen in FIGS. 8–11, 12B, 13B, and 14, friction facing material 15 may be utilized with other types of friction members such as a clutch plate 90, where it is circumferentially positioned around a front or rear surface 92. There are several ways for friction facing material 15 to be positioned on clutch plate surface 92, such as non-interlocking arcuate segments 94 (see FIG. 8). This arrangement forms channels 95 between each arcuate segment 94 which may permit a greater flow of cooling oil than channels 36 and 37, depending on the width of channels 95. Alternatively, friction facing material 15 may include interlocking arcuate segments 96 to form a complete ring around clutch plate surface 92, as seen in FIG. 9 and disclosed in U.S. Pat. No. 4,260,047 to Nels which is hereby incorporated by reference. As seen therein, each interlocking segment 96 includes a male extension 98 at a first end and a female receptacle 99 at a second end which may be mated together. The advantages of utilizing arcuate segments 94 or 96 for a ring-shaped object like clutch plate surface 92 are that it saves material during the blanking process and allows the yarn cooperating with the mating surface to remain approximately parallel with the direction of engagement and disengagement between the friction elements. Nevertheless, friction facing material 15 may be plain cut (or blanked) as a full ring 100 (see FIG. 10).

Figure 11:
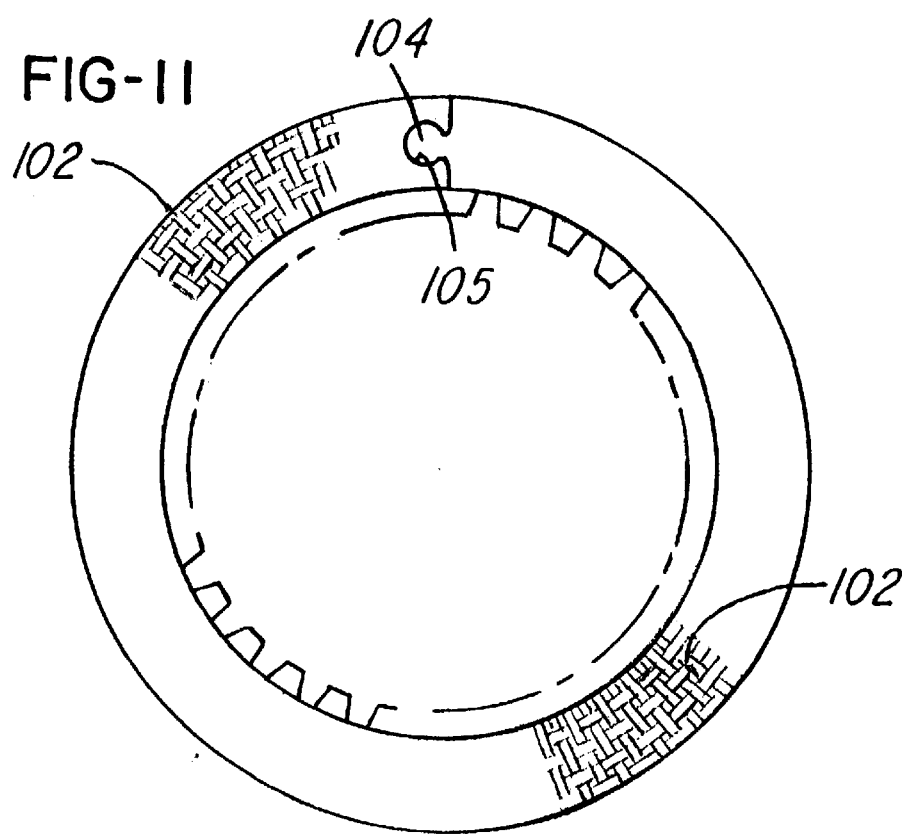
FIG. 11 is a diagrammatic depiction of the friction facing material of the present invention being arranged as an edge wound full ring on a clutch plate.

Alternatively, a strip of friction facing material 15 may be formed into a flattened hoop 102 so that it may be edge wound about clutch plate surface 92 as seen in FIG. 11. Such a strip of friction facing material 15 preferably includes a single male extension 104 at one end and a single female receptacle 105 at the other end so that each end of hoop 102 may be properly mated.

Figure 12A:
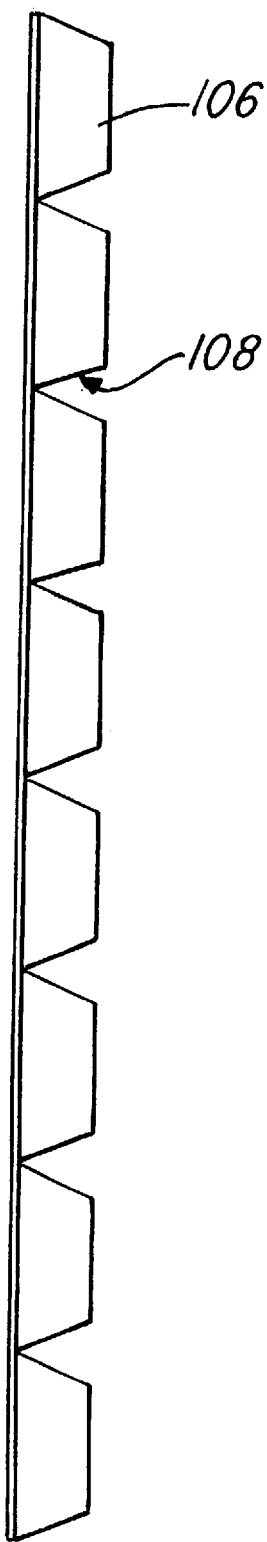
FIG. 12A is a diagrammatic depiction of a strip of the friction facing material of the present invention, where a plurality of notches have been formed therein.
Figure 12B:
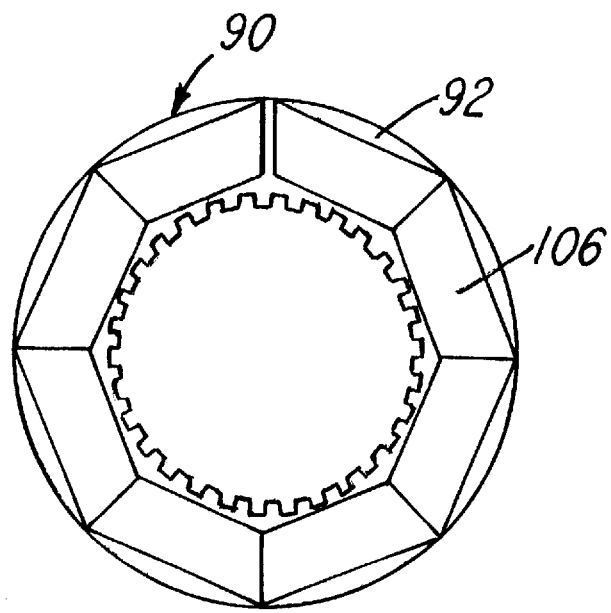
FIG. 12B is a diagrammatic depiction of the strip of friction facing material shown in FIG. 12A arranged on a clutch plate.
Figure 13B:
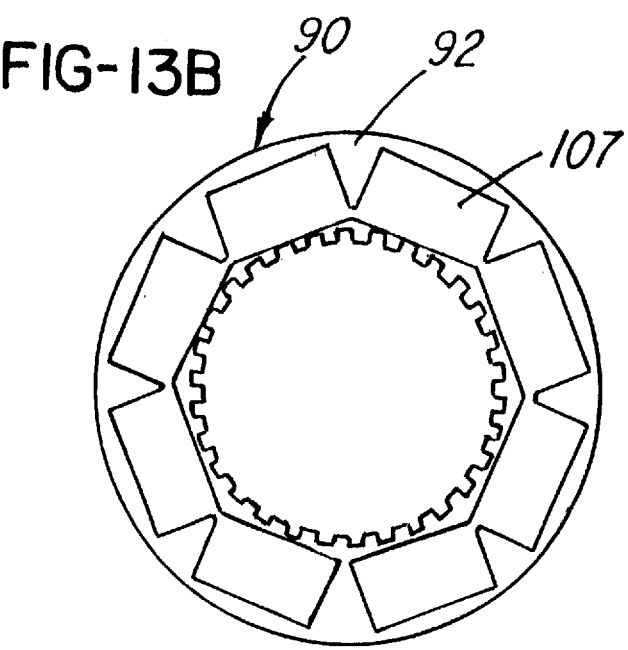
FIG. 13B is a diagrammatic depiction of the strip of friction facing material shown in FIG. 13A arranged on a clutch plate.
Figure 13A:
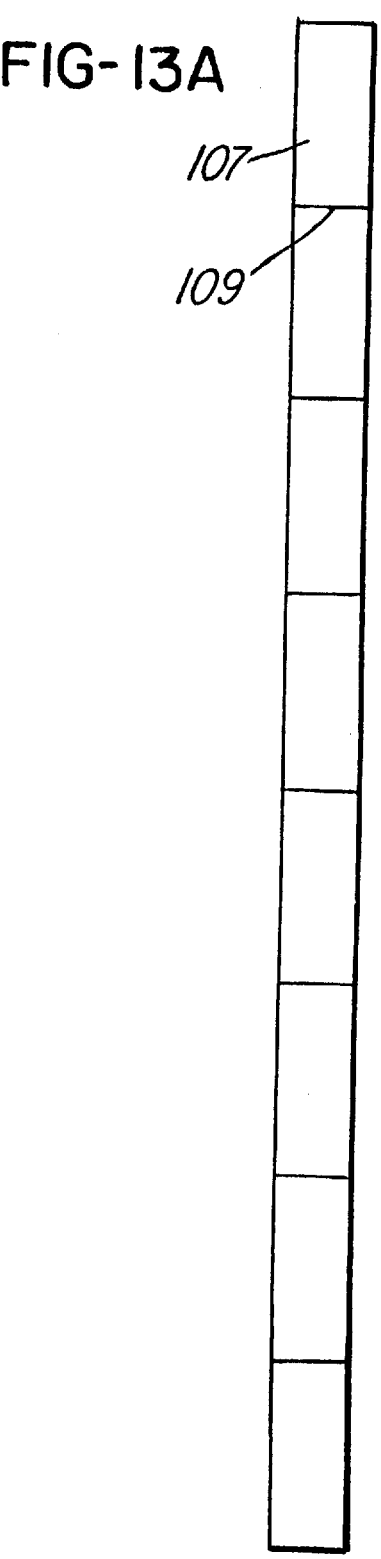
FIG. 13A is a diagrammatic depiction of a strip of friction facing material of the present invention, where a plurality of lances have been formed therein.

As seen in FIGS. 12A and 13A, strips 106 and 107 of friction facing material 15 may have notches 108 or lances 109 formed therein. Then, strips 106 and 107 may be positioned on clutch plate surface 92 as seen in FIGS. 12B and 13B, whereby notches 108 are brought together or lances 109 are pulled apart. In either case, strips 106 and 107 form a multi-sided shape that is sized to fit on clutch plate surface 92.

Figure 14:
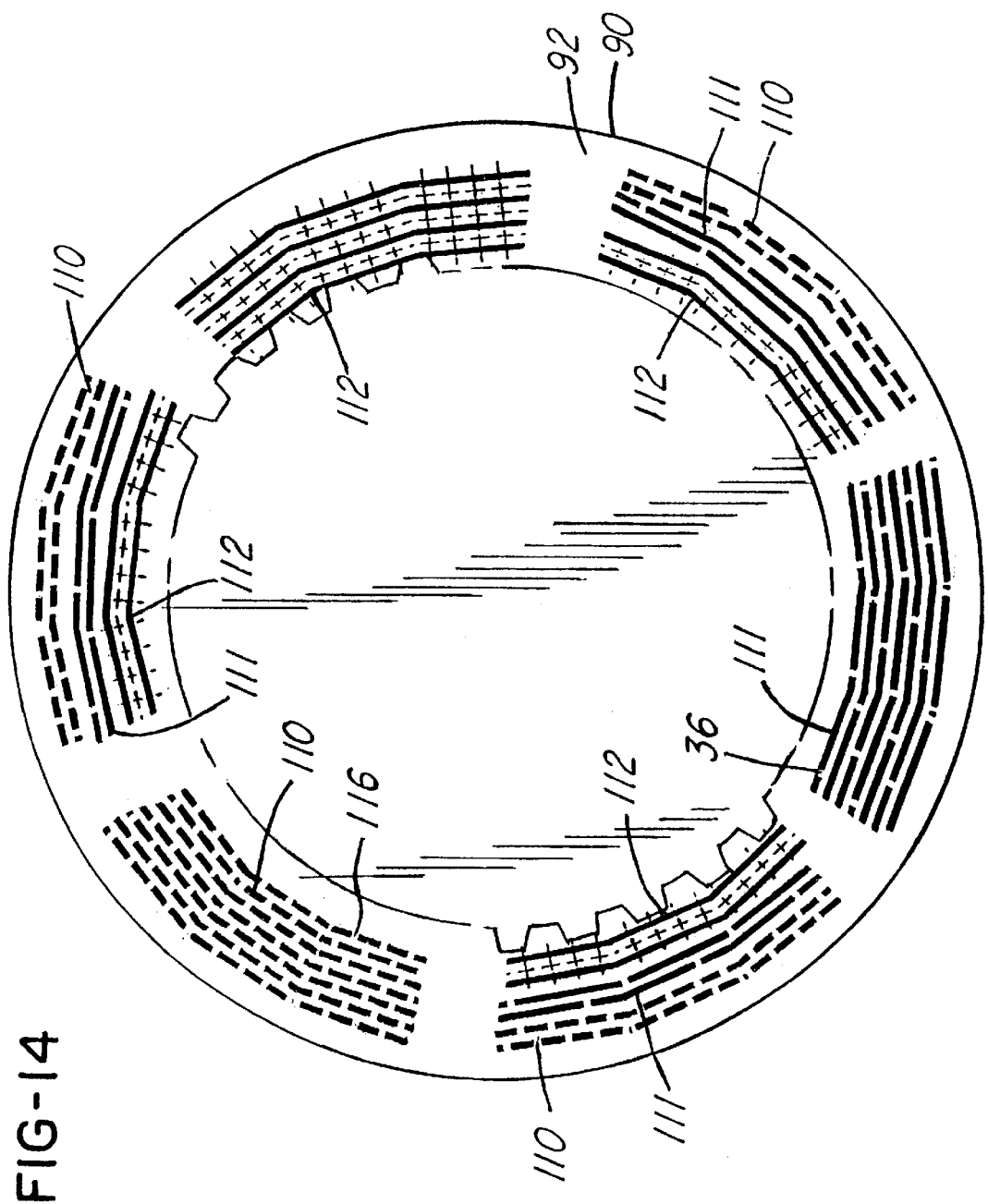
FIG. 14 is a diagrammatic depiction of friction facing materials having different weave patterns, including some with several layers of different weave patterns, being circumferentially arranged as non-interlocking arcuate segments on a clutch plate.

As shown in FIG. 14, it will be understood that friction facing material of different weaves may be utilized together. There, friction facing material 110, 111, and 112 of various weaves are attached to surface 92 of clutch plate 90 in the form of non-interlocking arcuate segments. It will be seen that friction facing material 110 has the greatest number of flow paths as defined by upper channels 36 and 37 (indicated by white areas 116), thereby permitting the greatest amount of cooling flow. Friction facing material 111 has some flow paths, but fewer than friction facing material 110. Finally, friction facing material 112 has no leakage paths. Thus, depending on the desired amount of cooling medium flow or leakage for a particular area, the friction facing material can be tailored thereto. This may be taken a step further, wherein friction facing material 110, 111, and 112 of different weaves may be radially aligned in several layers as shown in FIG. 14. In this way, complete control of the flow characteristics for a given application may be controlled solely by the weave and arrangement of the friction facing material.

With respect to the method of making friction facing material 15, it will be understood that fill yarns 25 and warp yarns 30 and 31 preferably are initially carbonized in a high temperature oven. Thereafter, fill yarns 25 and warp yarns 30 and 31 are woven in a designated pattern for the particular application so that channels 36, 37, 38 and 39, and possibly cooling vents 65, 70 or 75, are formed to provide the requisite flow paths. In order to fix or lock the woven pattern of fill yarns 25 and warp yarns 30 and 31, friction facing material 15 is then preferably carbonized again in a high temperature oven. To further enhance the locking process, friction facing material 15 preferably is saturated with a resin, such as a phenolic resin, and cured at an appropriate amount initially in an oven and subsequently at an appropriate amount during the bonding process described hereinafter.

Once the above steps have been accomplished, adhesive 20 is then applied to one surface of the saturated fabric, such as by lamination. Friction facing material 15 is then ready for blanking, where either arcuate segments, whole rings, or strips are cut from the rolls of material. Lastly, friction facing material 15 is bonded to a desired friction element, such as blocker ring 10 or clutch plate 90. It has been found that a punch-die arrangement works well to press friction facing material 15 into place on blocker ring 10. For example, the punch may provide pressure in the range of 50–800 lbs. per square inch for approximately 40–100 seconds. In order to prevent adhesive 20 and phenolic resin from wicking into friction facing material 15 during this process, since adhesive 20 will tend to be attracted to the element having a higher temperature, a temperature differential preferably is established between the punch and the die (e.g., the die preferably having a temperature of approximately 550° F. and the punch having an initial temperature of approximately 250° F. increasing to approximately 400° F. during the bond cycle as heat moves from the die through the ring adhesive layer, and friction facing material into the punch).

Having shown and described the preferred embodiments of the present invention, wherein an inventive friction facing material, the method of making the friction facing material, and a friction element including the friction facing material thereon have been disclosed, it will be understood that further adaptations thereof may be accomplished by appropriate modifications by one of ordinary skill in the art without departing from the scope of the invention. In particular, while the embodiments of the inventive friction facing material have been described herein as preferably including warp yarns weaving with a plurality of substantially linear fill yarns, the opposite thereof is also contemplated (i.e., where fill yarns may be woven with a plurality of substantially linear warp yarns). Further, the specific weaves and materials disclosed herein are also preferred embodiments, since the yarns may also be braided, but should not be deemed limiting on the intent of the present invention.

It should also be appreciated that the invention could be applied to a wet or dry environment where the control of fluid flow is required, and the channels defined by the predetermined yarn arrangement may be used to channel heating or cooling fluids, including gases and liquids.

What is claimed is:

1. A friction facing material comprising:
   (a) a plurality of first yarns positioned in substantially parallel relationship to each other; and
   (b) a plurality of second yarns woven over and under said first yarns to form a texture having a plurality of plateaus and low points;
   said plurality of first yarns and said plurality of second yarns are woven to provide a plurality of channels or paths each of which comprise an entry and exit for channelling said cooling medium in a desired flow path.

2. The friction facing material of claim 1, wherein said second yarns are oriented substantially parallel to the direction of movement of said second yarns when they are used in a friction environment.

3. The friction facing material of claim 1, wherein said first yarns are tensioned greater than said second yarns.

4. The friction facing material of claim 1, further comprising a plurality of upper channels defined between adjacent plateaus and a plurality of lower channels defined between adjacent low points.

5. The friction facing material of claim 4, wherein said low points are interconnected.

6. The friction facing material of claim 4, wherein said upper and lower channels are configured in such manner as to control the amount and speed of cooling medium flow across said material during engagement of said cooperating members.

7. The friction facing material of claim 4, wherein said upper channels have tapered side walls.

8. The friction facing material of claim 1, wherein said first and second yarns have at least 9 twists per inch.

9. The friction facing material of claim 1, wherein said second yarns are woven over a plurality of adjacent first yarns and under at least one less of said first yarns in alternating fashion, wherein a surface area of said plateaus is maximized.

10. The friction facing material of claim 1, wherein said first yarns are substantially linear.

11. The friction facing material of claim 1, wherein an angle between a longitudinal axis for each of said first and second yarns and each twist of said yarns relative thereto is 27° or more.

12. The friction facing material of claim 1, wherein said first and second yarns comprise a resin situated thereon to bind said yarns together.

13. The friction facing material of claim 1, wherein said first and second yarns are carbonized by heat treatment prior to being woven.

14. The friction facing material of claim 1, said first and second yarns being comprised of a material selected from the group consisting of fiberglass, silicon carbide, copper, ceramic, Kevlar, carbon and asbestos.

15. The friction facing material of claim 1, wherein said first and second yarns are woven in a pattern selected from the group consisting of plain, crowfoot satin, 2×2 basket, 5 HS, 8 HS, Leno, ⅔ twill, ¾ twill, non-crimp, ±45° plain, ±45° 8 HS, and ±45° crowfoot satin.

16. The friction facing material of claim 1, wherein said first yarns are fill yarns and said second yarns are warp yarns.

17. The friction facing material of claim 16, wherein said warp yarns include a first set and a second set, said first and second sets of warp yarns being woven with said fill yarns substantially 90° out of phase.

18. The friction facing material of claim 1, wherein said first yarns are warp yarns and said second yarns are fill yarns.

19. The friction facing material of claim 18, wherein said fill yarns include a first set and a second set, said first and second sets of fill yarns being woven with said warp yarns substantially 90° out of phase.

20. The friction facing material of claim 1, wherein said material has a plurality of layers of said first and second yarns.

21. The friction facing material of claim 20, further comprising:
   (a) a plurality of multi-layered first yarns and single layered first yarns in alternating arrangement;
   (b) a first set of second yarns woven over said multi-layered first yarns and under said single layered first yarns to form a texture having a plurality of plateaus and low points; and (c) a second set of second yarns positioned between adjacent yarns of said first set of second yarns, said second set of second yarns being woven under said multi-layered first yarns and over said single layered first yarns to form a texture having a plurality of plateaus and low points;

wherein a plurality of internal cooling vents is formed between said plateaus of said first set of second yarns and said low points of adjacent yarns of said second set of second yarns and between said plateaus of said second set of second yarns and low points of adjacent yarns of said first set of second yarns.

22. The friction facing material of claim 21, further comprising a third set of second yarns woven between said multi-layered first yarns and over and under said single layered first yarns in alternating fashion.

23. The friction facing material of claim 22, wherein upper and lower cooling vents are formed in said material as defined by said third set of second yarns.

24. The friction facing material of claim 20, further comprising:

(a) a plurality of multi-layered first yarns;

(b) a first set of second yarns woven over and under adjacent first yarns for each layer of said material; and (c) a second set of second yarns positioned between adjacent yarns of said first set of second yarns, said second set of second yarns being woven under and over adjacent first yarns for each layer of said material substantially 90° out of phase with said first set of second yarns;

wherein first yarns of certain layers are omitted to form a cooling vent of desired size and shape.

25. The friction facing material of claim 1, wherein said first and second yarns comprise a binder situated thereon so that said yarns are bound together.

26. The friction facing material of claim 25, wherein said binder is a phenolic resin.

27. The friction facing material of claim 25, wherein said binder is maintained within a weight range of less than about 50% of the overall weight of said friction facing material.

28. The friction facing material of claim 27 wherein said range is between about 35%–50%.

29. The friction facing material as recited in claim 1, wherein at least one of said plurality of channels defines a non-linear path.

30. The friction facing material as recited in claim 1, wherein at least one of said plurality of channels defines a linear path.

31. The friction facing material as recited in claim 1, wherein a size of each of said plurality of channels or paths is defined to control a velocity of said cooling medium.

32. The friction facing material as recited in claim 1, wherein a size of each of said plurality of channels or paths is defined to control an amount of said cooling medium which is forced through.

33. A friction power absorption or power transmission assembly comprising:

(a) a first member;

(b) a second member situated in opposed relationship to said first member;

(c) a friction facing material affixed to one of said first and second members, said friction facing material comprising:

(1) a plurality of fill yarns positioned in substantially parallel relationship to each other; and (2) a plurality of warp yarns woven over and under said fill yarns to form a texture having a plurality of plateaus and low points;

wherein only said plateaus of said warp yarns engage the other of said members, said plurality of fill yarns and said plurality of warp yarns being woven to define a plurality of channels each of which comprise an entry and exit for channeling a cooling medium in a desired flow path.

34. The assembly of claim 33, wherein said warp yarns are oriented substantially parallel to the direction of movement of said first and second members.

35. The assembly of claim 33, further comprising a plurality of upper channels defined between adjacent plateaus and a plurality of lower channels defined between adjacent low points.

36. The assembly of claim 35, wherein said upper channels have tapered side walls.

37. The assembly of claim 33, wherein said fill and warp yarns have at least 9 twists per inch.

38. The assembly of claim 33, wherein said material is saturated with resin to fix said fill and warp yarns in position.

39. The assembly of claim 33, said fill and warp yarns being comprised of a material selected from the group consisting of fiberglass, silicon carbide, copper, rayon, ceramic, Kevlar, carbon and asbestos.

40. The assembly of claim 33, wherein said fill and warp yarns are woven in a pattern selected from the group consisting of plain, crowfoot satin, 2×2 basket, 5 HS, 8 HS, Leno, ⅔ twill, ¾ twill, non-crimp, ±45° plain, ±45° 8 HS, ±45° crowfoot satin.

41. The assembly of claim 33, wherein said fill and warp yarns are woven in such manner as to control the amount and speed of cooling medium flow across said material during engagement of said first and second members.

42. The assembly of claim 33, wherein said material has a plurality of layers of said fill and warp yarns.

43. The assembly of claim 33, said member having said friction facing material affixed thereto being substantially ring-shaped.

44. The assembly of claim 43, wherein said friction facing material is applied to an inner annular wall of said member.

45. The assembly of claim 43, wherein said friction facing material is affixed to an outer annular wall of said member.

46. The assembly of claim 43, wherein said friction facing material is affixed to a side wall of said member.

47. The assembly of claim 43, wherein said member is a blocker ring.

48. The assembly of claim 43, wherein said member is a clutch plate.

49. The assembly of claim 43, wherein said member is a torque converter clutch pressure plate.

50. The assembly of claim 43, wherein said member is a transmission band.

51. The friction facing material as recited in claim 33, wherein at least one of said plurality of channels defines a non-linear path.

52. The friction facing material as recited in claim 33, wherein a size of each of said plurality of channels or paths is defined to control a velocity of said cooling medium.

53. The friction facing material as recited in claim 33, wherein a size of said desired flow path is defined to control a velocity of said cooling medium.

54. The friction facing material as recited in claim 33 wherein a size of each of said plurality of channels or paths is defined to control an amount of said cooling medium which is forced through.

55. A friction facing material for use in a clutch or brake environment, comprising:
   (a) a plurality of first yarns; and
   (b) a plurality of second yarns woven with said plurality of first yarns to form a plurality of flow paths or channels, each of said plurality of flow paths channels having an entry and an exit to control fluid flow between a low pressure area and a high pressure area.

56. The material of claim 55, wherein said first yarns are tensioned greater than said second yarns.

57. The material of claim 55, wherein said second yarns are woven over a plurality of adjacent first yarns and under at least one less of said first yarns in alternating fashion, wherein a surface area of said plateaus is maximized.

58. The material of claim 55, said first and second yarns being comprised of a material selected from the group consisting of fiberglass, silicon carbide, copper, ceramic, Kevlar, carbon and asbestos.

59. The material of claim 55, wherein said first and second yarns are woven in a pattern selected from the group consisting of plain, crowfoot satin, 2×2 basket, 5 HS, 8 HS, Leno, 2/2 twill, 2/1 twill, non-crimp, ±45° plain, ±45° 8 HS, and ±45° crowfoot satin.

60. The material of claim 55, said texture having a plurality of layers.

61. The material of claim 60, further comprising a plurality of internal cooling vents therein.

62. The material of claim 55, wherein said first yarns are fill yarns and said second yarns are warp yarns.

63. The material of claim 62, wherein said warp yarns include a first set and a second set, said first and second set of warp yarns being woven with said fill yarns substantially 90° out of phase.

64. The material of claim 55, wherein said first yarns are warp yarns and said second yarns are fill yarns.

65. The material of claim 64, wherein said fill yarns include a first set and a second set, said first and second set of fill yarns being woven with said warp yarns substantially 90° out of phase.

66. The material of claim 55, wherein said first and second yarns comprise a binder situated thereon so that said yarns are bound together.

67. The material of claim 66, wherein said binder is a phenolic resin.

68. The material of claim 66, wherein said binder is maintained within a weight range of less than about 50% of the overall weight of said friction facing material.

69. The material of claim 68, wherein said range is between about 35%–50%.

70. The friction facing material as recited in claim 55, wherein at least one of said plurality of channels defines a non-linear path.

71. The friction facing material as recited in claim 55, wherein at least one of said plurality of channels defines a linear path.

72. The friction facing material as recited in claim 55, wherein a size of each of said plurality of channels or paths is defined to control a velocity of said cooling medium.

73. The friction facing material as recited in claim 55 wherein a size of each of said plurality of channels or paths is defined to control an amount of said cooling medium which is forced through.

74. A product comprising a friction material, said friction material comprising:
   a plurality of fibers formed into strands woven or braided together into a fabric, said strands having a binder so that said fibers are bound together;
   said strands being woven to define a flow path comprising an entry and an exit for oil to inhibit formation of a hydrodynamic film across an engagement surface of the friction material.

75. The product as set forth in claim 74 wherein said fibers comprise carbon.

76. The product as set forth in claim 74 wherein said binder comprises a phenolic resin.

77. The product as set forth in claim 74 wherein said binder comprises less than about 50% weight percent of said binder and strands together.

78. The product as set forth in claim 74 wherein said binder comprises between about 35%–50% weight of said binder and strands together.

79. The product as recited in claim 78 wherein said binder is a phenolic resin.

* * * * *

UNITED STATES PATENT AND TRADEMARK OFFICE
CERTIFICATE OF CORRECTION

PATENT NO. : 5,842,551
DATED : December 1, 1998
INVENTOR(S) : Terry E. Nels

It is certified that error appears in the above-identified patent and that said Letters Patent is hereby corrected as shown below:

Column 11,
Line 1, please delete the first occurrence of "a", and insert -- said -- therefor.
Line 1, please delete the second occurrence of "a", and insert -- said -- therefor.

Column 13,
Line 6, after the word "paths", please insert -- or --.
Line 13, after the word "fashion", please insert -- to form a texture comprising a plurality of plateaus --.

Column 14,
Line 19, after the word "through", please insert -- said plurality of channels or paths --.

Signed and Sealed this

Fourth Day of May, 2004

JON W. DUDAS
*Acting Director of the United States Patent and Trademark Office*